United States Patent Office 3,842,052
Patented Oct. 15, 1974

3,842,052
PROCESS FOR REMOVING THE SOLVENT FROM SOLUTIONS OF GUMMY POLYMERS
Silvano Gordini and Sergio Noé, San Donato Milanese, Italy, assignors to Snam Progetti, S.p.A., Milan, Italy
Continuation of application Ser. No. 81,476, Oct. 16, 1970. This application Dec. 19, 1972, Ser. No. 316,572
Int. Cl. C08d 5/00
U.S. Cl. 260—80.78         12 Claims

ABSTRACT OF THE DISCLOSURE

Hydrocarbon solvent is removed from a solution of gummy polymer by feeding the solution to a stripping vessel containing boiling water to which steam is supplied at a rate which establishes a temperature in the lower end of the range between 70° and the boiling point of water in the stripping vessel, and from which vapors are withdrawn, until the water/polymer ratio is between 20/1 and 6/1 when the feed of polymer solution is discontinued and additional steam is introduced until the temperature nearly reaches the upper end of said range. The resultant suspension is then filtered to separate polymer crumbs therefrom and the hot water recovered thereby is recycled so that the polymer/water ratio in the solvent removal stage is not higher than 1/100.

---

Figure 1:
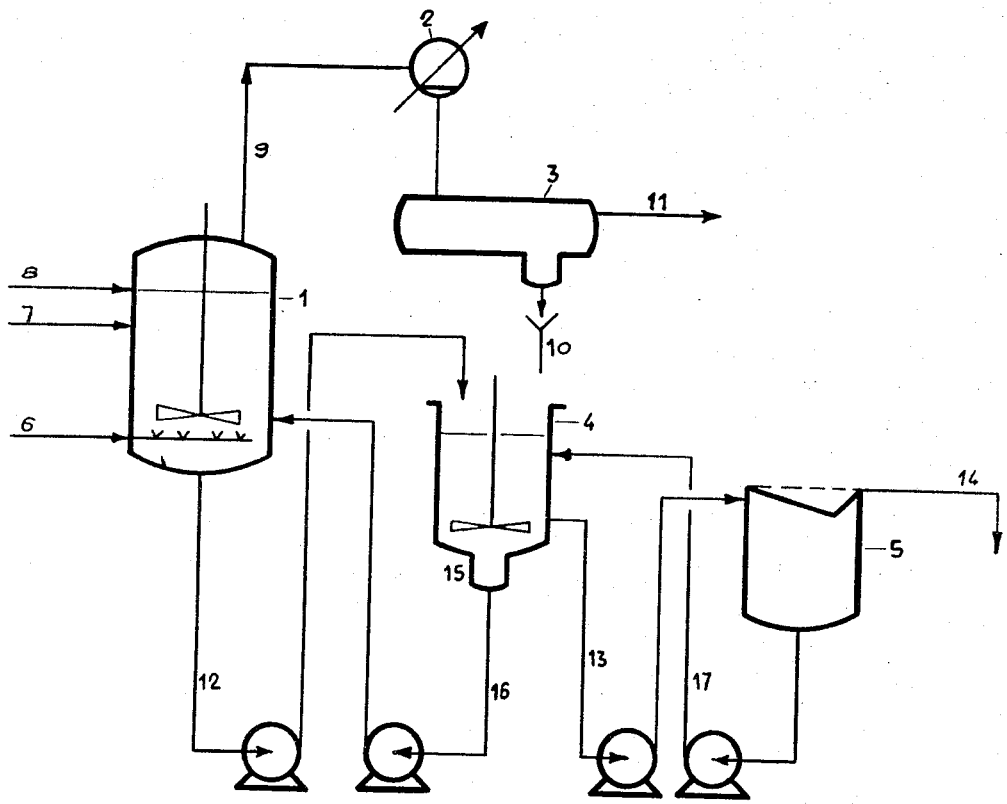

This is a continuation of application Ser. No. 81,476, now abandoned, filed Oct. 16, 1970.

The present invention relates to a process for removing the solvent from solutions of gummy polymers. The solvent removal is one of the more relevant technological problems in the production of gummy polymers.

The solvent is in almost all cases a hydrocarbon or a hydrocarbon fraction having a narrow boiling range; its removal has to be the more possible complete since in the successive drying and finishing operations it may give serious drawbacks. The operation is generally carried out by stripping the solvent with live steam so leaving in an aqueous suspension the solvent-free polymer in the form of crumbs. Such simple principle cannot be easily applied owing to their characteristics to gummy polymers as polybutadiene, polyisoprene and terpolymers.

The crumbs have to be small so as to avoid the solvent remains enclosed in them during the process of solvent removal and so as to facilitate the operation of transport of the suspension to the successive manipulations while on the same time an easy filtration imposes the crumbs be not smaller than a certain dimension. For any polymer, according to the used polymerization process, to the Mooney viscosity, to the concentration of the polymeric solution and to the used solvent there is an optimal combination of working conditions which allows an easier working.

As operation auxiliary medium a dispersing agent in an aqueous solution is often used, which agent acting on the surface tension allows the crumbs be wet by the water even if their solvent content is still considerable and they have a limited tendency to agglomerate. The type of stirring and the ratios among rubber, solvent and water have a remarkable influence on the operation.

Since the polymerization is carried out with a polymer solution highly diluted, the solvent amount to be removed, compared with the produced polymer, is great, and therefore steam consumptions sensibly affect the production cost.

In order to limit such consumptions, according to many patent specifications, the known conveniently modified principle of the multiple effect evaporation, is utilized.

The removal of the solvent from the polymer is effected in the conventional processes in two stages wherein temperatures and pressures are different, so as to utilize the steam produced in the stages at higher temperatures and pressures as stripping medium in the stages at lower temperatures and pressures.

The above mentioned processes, especially when used for polymers having a high tendency to agglomerate as polyisoprene, have such application difficulties that the convenience of the multiple effect evaporation is compromised.

In fact in order to obtain a polymer easily conveyable from a stage to the following one it is necessary that already in the first stage the reached amount of the removed solvent be very near the whole amount of solvent removed at the end of the process and this remarkably limits the process economy.

Still another fact is economically relevant in the use of the multiple effect evaporation. Since from the first stage steam is obtained which condensates in order to avoid plant complications said stage does not operate at pressures lower than the atmospheric one.

The second stage must then operate at a higher pressure and therefore there is a pressure drop during the discharge to the filtration, which is effected at atmospheric pressure.

The boiling water containing the suspension is then, during the filtration operation, subjected to a flash which causes the loss of the sensible heat relative to the range of the water boiling temperatures corresponding to the two pressures, said heat loss being in the range of 200–300 Kcal./kg. polymer.

A third drawback that occurs when the continuous process is used is the following one: by continuously recycling the hot water which separates during the crumbs filtration, said water, coming into contact with the atmosphere and re-entering the first stage, introduces oxygen into the stripping apparatus.

Since the solvent and the non-reacted monomer, by coming into contact with the oxygen, are capable of forming oxygenated compounds as hydroperoxides, the presence of such compounds in the streams which are recycled to the polymerization may be highly detrimental to the polymerization reaction.

The catalysts used for the production of stereospecific polymers are extremely sensitive to poisoning due to oxygenated compounds. Few parts per million of free or combined oxygen in the stream entering the polymerization reactor are detrimental.

Another drawback that may be found in the solvent removal continuous processes is the possibility of by-pass of polymer crumbs wherefrom the solvent has not been removed up to the desired limit. Intermediate stocking is therefore used so as to dilute, as much as possible, the possible by-pass.

It has now been found a process of simple execution for removing the solvent from gummy polymers including the following steps:

(a) Treating the polymer hydrocarbon solution containing hydrocarbon solvent, polymer and not reacted monomer under vigorous stirring with water kept boiling by intake of live steam, said intake being regulated so as to keep the temperature, after the suspension has been introduced, toward the lower end of the range between 70° C. and the boiling temperature of the water in the operative conditions.

(b) Stopping the polymer inlet when a value of the water/polymer ratio between 20/1 and 6/1 has been reached.

(c) Putting, in the conditions described in (b), more live steam in, so that the temperature reaches a value very near the upper limit of the range as defined in (a).

(d) In said conditions the suspension is sent to filtration so separating polymer crumbs and hot water which is recycled to the solvent removal apparatus in such a way to reach in the solvent removal stage a rubber/water ratio not higher than 1/100.

The filtration step can advantageously be effected in a continuous way; in such a case the mixture of water and polymer without solvent is transferred before the filtration into a stocking tank.

A preferred embodiment of the invention is the one wherein to the filtration step a suspension having a constant water/polymer ratio is fed. A simple way for obtaining said conditions consists in withdrawing from the stocking tank a part of the suspension water which is recycled to the stirring vessel.

The suspension present in the stocking tank has in such a way a water/polymer ratio substantially constant in the time and is fed to the filtration stage in such conditions. The water separated in the successive filtration is re-introduced in the stocking tank and therefrom is recycled to the stripping vessel.

The solvent removal by the process according to the present invention is effected at atmospheric pressure or at a pressure slightly higher than the atmospheric one so as to compensate the pressure drops. In order to facilitate the formation of crumbs of such dimension that the filtration is facilitated, a conventional dispersing agent can be added.

The process according to the present invention can be advantageously applied to gummy polymers as polybutadiene, polyisoprene, olefin terpolymers and the like. The process according to the present invention can be applied for removing from gummy polymers solvents chosen among 5 to 8 carbon atoms aliphatic hydrocarbons, 5 to 7 carbon atoms cycloaliphatic hydrocarbons, 6 to 8 carbon aotms aromatic hydrocarbons or mixtures of said hydrocarbons. The application of the process according to the present invention has been particularly advantageous in removing hexane.

The invention will now be illustrated with reference to the enclosed drawing wherein a preferred form of embodiment is shown.

In the drawing the stripping vessel is 1; 2 is the condenser of the vapours leaving the stripping vessel; 3 is the condensate decanter; 4 the stocking tank and 5 a vibrating screen.

The operations succession in the plant scheme according to FIG. 1 is the following one:

In the stripping vessel 1, kept at atmospheric or slightly higher than atmospheric pressure and provided with a stirrer, there is water kept boiling by means of steam introduced through duct 6; through duct 7 the polymer solution to be treated is introduced, while the dispersing agent is introduced in form of solution through duct 8.

Through 6 steam is continuously introduced and the generated vapours are withdrawn through line 9, which is connected to the condenser 2 and to the decanter 3 wherefrom an aqueous phase, separated at the bottom, is discharged through 10 and a top water-saturated phase consisting of solvent and not reacted monomer is discharged through 11 into a recovery apparatus not shown in the drawing. The temperature in 1 is kept at a constant value of about 75° C. by regulating steam inlet until the water/polymer ratio in the suspension has reached the desired value.

The polymeric solution feeding is then stopped while steam is continuously admixed until the temperature reaches about 100° C. and the solvent amount held by the polymers crumbs lowers below 0.5%. Through line 12 the aqueous polymer suspension is transferred under stirring to the stocking tank 4, which continuously feeds, through line 13, the vibrating screen 5, wherein filtration is effected. The separated polymer is recovered through line 14.

The stocking tank 4 is provided with a not stirred zone 15, wherein water substantially free of polymer crumbs accumulates. Said water is recycled to 1 from said zone 15 through line 16. The water separated during the filtration in 5 is drawn through line 17 and introduced into 4. Obviously in the case that no continuous filtration is required, the stocking tank 4 can be suppressed and the vibrating screen 5 can be directly fed.

The following example shows a particular embodiment of the invention but it has to be considered as not limitative of the same.

EXAMPLE

At the beginning a hexane solution containing 13.5% of polyisoprene cis was fed at a rate of 160 kg./h. to a vessel provided with a stirrer, having a usable volume of 100 lt. filled with water kept boiling by live steam intake. During the feeding the pressure was at a substantially atmospheric value and the temperature was kept at 72° C. by regulating the live steam intake.

In said conditions most solvent entering with the polymeric solution was vaporized and removed together with steam, being the ratio about 6/1 by weight. The polymer remained suspended in the water in the form of crumbs which still contained a little initial solvent. The suspension water had a content of dispersing agent of about 1% based on the fed polymer.

After the polymeric solution had been fed for 30 minutes the polymer contained in the aqueous suspension was in the ratio of 1/10 based on the suspension water. At this time the polymeric solution feeding was stopped and steam was admixed so as to increase the temperature of the suspension up to 99° C. in a time of about 10'. By working in said conditions the solvent still contained in the polymer during the preceding stage was vaporized and removed together with steam, being their medium ratio during this stage 0.5/1 by weight. The solvent still present in the polymer was less than 0.5% by weight based on the polymer.

The polymeric suspension so obtained was then fed into a stocking stirred tank provided with a settling zone wherefrom water was at the same time recycled to the stripping vessel so as to maintain the water/polymer ratio of the suspension in the stocking tank about 10/1. From the stocking tank the water/polymer suspension which had a constant titre was continuously transferred to the filtration stage. The water coming from the filtration stage was recycled to the stocking tank during the discharge.

The operation of discharge of the polymeric suspension from the stripping vessel continued until in said vessel the residue polymer content in the suspension was lower than 0.5%. In said conditions the total steam consumption for the whole stripping cycle was 280 kg. per 100 kg. of treated polymer. The amount of used dispersing agent was 0.1 kg. per 100 kg. of treated polymer.

What we claim is:

1. Batch process for removing the solvent from gummy solutions of polymers selected from group consisting of polybutadiene, polyisoprene and olefin terpolymers, said process being carried out in one stage at atmospheric pressure comprising:
   (a) feeding a hydrocarbon solution of the polymer which contains hydrocarbon solvent having a boiling temperature below water, the polymer and un-reacted monomer into a solvent-removal vessel containing water and forming a suspension of said hydrocarbon solution in said water;
   (b) while feeding said hydrocarbon solution, treating said suspended solution by feeding live steam into said suspension to keep said suspension agitated and vigorous stirring said suspension and regulating said live steam feed so as to maintain the temperature at a temperature between 70° C. and 75° C. and the pressure at atmospheric pressures;
   (c) stopping the feed of the hydrocarbon solution of the polymer into said vessel when a value of the water/polymer ratio in said vessel from about 20/1 to about 6/1 has been reached;

(d) after the feed of said hydrocarbon solution into said vessel is stopped, feeding more live steam into said vessel so that the temperature in said vessel reaches a value very near the boiling temperature of the water in said vessel in the process conditions while the pressure in said vessel is maintained at atmospheric pressure whereby the solvent still present in the polymer is less than 0.5% by weight based on the polymer;

(e) subjecting the suspension at such temperature near the boiling temperature of the water to a filtration and separating polymer crumbs and hot water and recycling said hot water to the solvent-removal vessel until a polymer-water ratio not higher than 1/100 is reached in said solvent-removal vessel.

2. Process as recited in claim 1 characterized in that said suspension is transferred into a stock tank before said filtration.

3. Process as recited in claim 2 characterized in that a suspension having a constant water/polymer ratio is sent to the filtration, a part of the suspension water being recycled to the solvent-removal vessel.

4. Process as recited in claim 1 wherein a dispersing agent is present.

5. Process as recited in claim 4 wherein the dispersing agent amount is 0.5–5% of produced polymer.

6. Process as recited in claim 1 wherein the polymer is a gummy polymer.

7. Process as recited in claim 6 wherein the polymer is a diene polymer.

8. Process as recited in claim 6 wherein the polymer is polybutadiene.

9. Process as recited in claim 6 wherein the polymer is polyisoprene.

10. Process as recited in claim 6 wherein the polymer is a terpolymer.

11. Process as recited in claim 1 wherein the solvent is selected from the class of aliphatic hydrocarbons having from 5 to 8 carbon atoms, cycloaliphatic hydrocarbons having from 5 to 7 carbon atoms, aromatic hydrocarbons having from 6 to 8 carbon atoms or mixtures of said hydrocarbons.

12. Process as recited in claim 6 wherein the hydrocarbon solvent is hexane and the temperatures are respectively 75° C. for stage (b) and 98° C. for stage (d).

References Cited
UNITED STATES PATENTS

| | | | |
|---|---|---|---|
| 3,247,176 | 4/1966 | Veal | 260—94.7 |
| 3,287,301 | 11/1966 | Fysh et al. | 260—23.7 |
| 3,429,866 | 2/1969 | Gibbs | 260—94.7 X |
| 3,553,186 | 1/1971 | Schnoring et al. | 260—94.7 |
| 3,583,967 | 6/1971 | Hattori et al. | 260—94.7 |
| 3,751,402 | 8/1973 | Broering | 260—82.1 |

JOSEPH L. SCHOFER, Primary Examiner

W. H. HAMROCK, Assistant Examiner

U.S. Cl. X.R.

260—947 R, 82.1, 94.7 A, 96 R